(12) United States Patent
Zhang et al.

(10) Patent No.: US 11,579,367 B2
(45) Date of Patent: Feb. 14, 2023

(54) INTEGRATED WAVEGUIDE POLARIZER (71) Applicant: Alpine Optoelectronics, Inc., Fremont, CA (US)

(72) Inventors: Xingyu Zhang, Fremont, CA (US); Tongqing Wang, Fremont, CA (US); Dawei Zheng, Fremont, CA (US); Zhoufeng Ying, Fremont, CA (US)

( * ) Notice: Subject to any disclaimer, the term of this patent is extended or adjusted under 35 U.S.C. 154(b) by 102 days.

(21) Appl. No.: 17/172,443

(22) Filed: Feb. 10, 2021

(65) Prior Publication Data

US 2022/0252783 A1 Aug. 11, 2022

(51) Int. Cl.
*G02B 6/27* (2006.01)
*G02B 6/126* (2006.01)
*G02B 6/12* (2006.01)

(52) U.S. Cl.
CPC ............ *G02B 6/276* (2013.01); *G02B 6/126* (2013.01); *G02B 6/12016* (2013.01); *G02B 2006/12061* (2013.01); *G02B 2006/12116* (2013.01)

(58) Field of Classification Search
CPC .... G02B 6/2726; G02B 6/274; G02B 6/2753; G02B 6/276; G02B 6/1228; G02B 6/12116
See application file for complete search history.

(56) References Cited

U.S. PATENT DOCUMENTS

| | | | |
|---|---|---|---|
| 2015/0316720 A1* | 11/2015 | Yang | G02B 6/1228 385/14 |
| 2017/0212304 A1* | 7/2017 | Sacher | G02B 6/122 |
| 2020/0166703 A1* | 5/2020 | Charles | G02B 6/12004 |
| 2021/0231866 A1* | 7/2021 | Tu | G02B 6/305 |
| 2021/0239903 A1* | 8/2021 | Bian | G02B 6/12002 |

FOREIGN PATENT DOCUMENTS

WO WO 2021/175082 A1 * 9/2021

\* cited by examiner

*Primary Examiner* — Michael Stahl
(74) *Attorney, Agent, or Firm* — Cionca IP Law P.C.; Marin Cionca (57) ABSTRACT

An integrated waveguide polarizer comprising: a plurality of silicon layers and a plurality of silicon-nitride layers; each of the plurality of silicon layers and each of the plurality of silicon-nitride layers having a first end and an opposite second end, the first end having a wide width and the second end having a narrow width, such that each silicon layer and each silicon-nitride layer have tapered shapes; wherein the pluralities of silicon and silicon-nitride layers are overlapped, such that at least a portion of each silicon-nitride layer overlaps at least a portion of each silicon layer; and a plurality of oxide layers disposed between the pluralities of silicon-nitride and silicon layers, each oxide layer creating a separation spacing between each silicon-nitride and each silicon layers; wherein, when an optical signal is launched through the integrated waveguide polarizer, the optical signal is transitioned between each silicon-nitride layer and each silicon layer.

20 Claims, 4 Drawing Sheets

INTEGRATED WAVEGUIDE POLARIZER

BACKGROUND OF INVENTION

1. Field of the Invention

The invention relates generally to on-chip integrated waveguide polarizers, and more specifically to on-chip integrated waveguide polarizers based on cascaded silicon and silicon nitride transitions.

2. Description of the Related Art

In the field of integrated photonics, waveguide polarizers integrated onto optical waveguides of photonics chips are widely used and are increasingly important optical components for supporting transverse-electric (TE) and transverse-magnetic (TM) polarization states in various integrated photonics applications. As is known, optical light waves have an associated electric field and magnetic field and depending on the transmission mode of said optical light waves, the axis of oscillation may have different orientations to the direction of travel. As an example, an on-chip waveguide polarizer transforms (e.g., linearly polarizes) an optical signal propagating through an optical channel of an integrated photonics chip, such that one polarization state is allowed to pass, and the other polarization state is effectively blocked/prevented from passing. In order to optimize the efficiency of a waveguide polarizer, key parameters should be optimized, such as the polarization extinction ratio (or the difference between the TE loss and TM loss), the device loss (or the loss tolerable for the desired polarization state to pass), and the optical bandwidth (or the working wavelength range). When optimizing these key parameters, one would ideally configure the polarizers such that the polarization extinction ratio is as large as numerically possible, the device loss is as small as numerically possible, and the optical bandwidth is as wide as numerically possible, for example.

Conventionally, on-chip waveguide polarizers may be based on shallowly etched ridge waveguides, waveguide bends, asymmetric directional couplers, mode converters, and carrier injections, among other approaches. However, these conventional approaches may not offer broad optical bandwidth and high polarization extinction ratio, while also showing low device loss, simultaneously, or may require complex manufacturing processes. In particular, the shallowly etched ridge waveguide approach requires at least two photolithography and etch steps in the silicon waveguide, which may increase manufacturing costs associated with implementing those types of polarizers. Furthermore, some of the above approaches (e.g., carrier injection-based polarizers) may require an additional ion implantation process, which may resultantly increase manufacturing costs. Moreover, waveguide bends and mode converters require specific bending designs and mode conversion designs to be integrated onto the optical waveguide, respectively, which may increase manufacturing costs associated with implementing those types of polarizers.

Therefore, there is a need to solve the problems described above by providing a universal on-chip integrated waveguide polarizer having cascaded silicon and silicon nitride transitions and method for efficiently, cost-effectively, and passively polarizing an optical signal.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated waveguide polarizer is provided. The integrated waveguide polarizer may comprise: a plurality of silicon layers and a plurality of silicon-nitride layers; each of the plurality of silicon layers and each of the plurality of silicon-nitride layers having a first end and an opposite second end, the first end having a selectively wide width and the second end having a selectively narrow width, such that each silicon layer and each silicon-nitride layer have tapered shapes; wherein each silicon-nitride layer is disposed above each silicon layer, such that at least a portion of each silicon-nitride layer overlaps at least a portion of each silicon layer; and a plurality of oxide layers disposed between the pluralities of silicon-nitride layers and silicon layers, each oxide layer of the plurality of oxide layers creating a separation spacing between each silicon-nitride layer and each silicon layer; wherein, when an optical signal is launched through the integrated waveguide polarizer, the optical signal is caused to transition between each silicon-nitride layer and each silicon layer via the overlapped portions of each silicon-nitride and silicon layers, the transitioning between each silicon-nitride and silicon layers inducing losses on the transverse-electric (TE) and the transverse-magnetic (TM) polarization states of the optical signal, the induced loss on the TE polarization state being lower than the induced loss on the TM polarization state. Thus, an advantage is that the SiN—Si or Si—SiN transition of the integrated waveguide polarizer may realize a high extinction ratio. Another advantage is that the SiN—Si or Si—SiN transition of the disclosed waveguide polarizer may show low device loss for the TE polarization state. An additional advantage is that the SiN—Si or Si—SiN transition of the disclosed waveguide polarizer may realize a broad optical bandwidth.

In another aspect, an integrated waveguide polarizer is provided. The integrated waveguide polarizer may comprise a plurality of cascaded layer transitions, each cascaded layer transition of the plurality of cascaded layer transitions having a silicon (Si) layer and a silicon-nitride (SiN) layer each having a first end and an opposite second end, the first end having a selectively wide width and the second end having a selectively narrow width, such that the silicon layer and the silicon-nitride layer each has a tapered shape, the silicon-nitride layer being disposed above the silicon layer, such that at least a portion of the silicon-nitride layer overlaps at least a portion of the silicon layer, such that the second ends of the silicon-nitride layer and the silicon layer are overlapped and oriented to face in opposite directions, and wherein a first and a second cascaded layer transitions of the plurality of cascaded layer transitions are coaxially aligned, such that the first ends of a first and a second silicon-nitride layers of the first and the second cascaded layer transitions, respectively, are coaxially aligned and joined, such that the second ends of a first and a second silicon layers of the first and the second cascaded layer transitions, respectively, are oriented to face each other. Thus, an advantage is that the cascaded SiN—Si and Si—SiN transitions of the integrated waveguide polarizer may realize a high extinction ratio. Another advantage is that the cascaded SiN—Si and Si—SiN transitions of the disclosed waveguide polarizer may show low device loss for the TE polarization state. An additional advantage is that the SiN—Si and Si—SiN transitions of the disclosed waveguide polarizer may realize a broad optical bandwidth.

In another aspect, a method of integrating a waveguide polarizer onto an optical waveguide of an integrated photonics chip is provided. The method may comprise the steps of: depositing a plurality of first layers each having a first end and an opposite second end onto the optical waveguide, each first end having a selectively wide width and each second end having a selectively narrow width; providing an oxide layer having a thickness atop each first layer of the plurality of first layers, the oxide layer providing a separation spacing above each first layer; and depositing a plurality of second layers each having a first end and an opposite second end atop each of the oxide layers, such that at least a portion of each second layer overlaps at least a portion of each first layer, each first end having a selectively wide width and each second end having a selectively narrow width; wherein each first layer and each second layer are coaxially aligned; the waveguide polarizer being thus adapted such that when an optical signal is launched into the optical waveguide, the optical signal is propagated through the pluralities of first and second layers, the optical signal being caused to transition between each first layer and each second layer via the overlapped portions of each first and second layers, the transitioning between each first and each second layers inducing losses on the transverse-electric (TE) and the transverse-magnetic (TM) polarization states of the optical signal. Thus, an advantage is that the disclosed waveguide polarizer may be integrated onto a photonics chip using known and readily available CMOS fabrication processes. In comparison to conventional methods using active optical polarizers, another advantage of the disclosed passive waveguide polarizer is a reduction in overall power consumption, and therefore operational costs, during product operation. An additional advantage is that the disclosed waveguide polarizer may be universally applied to various optical waveguides, not just optical waveguides based on silicon.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 111 and 311, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1A:
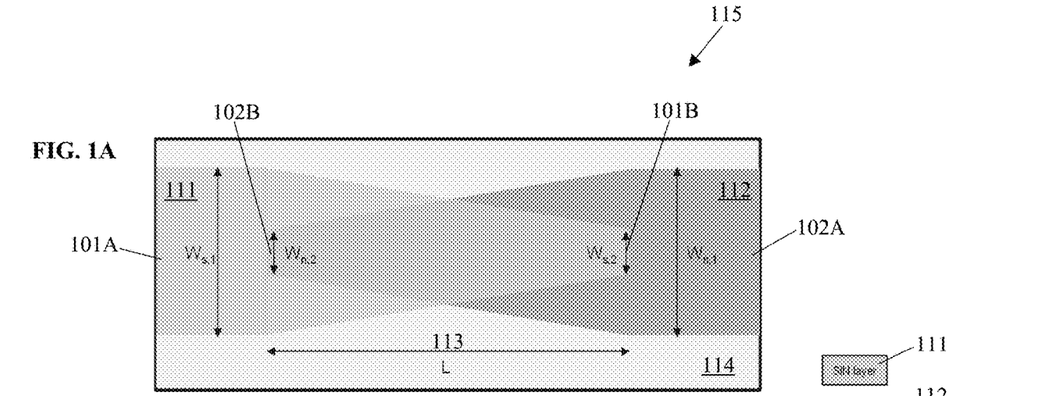
FIGS. 1A-1B are diagrams illustrating a top view and a side view, respectively, of a silicon-nitride to silicon transition used to form an integrated waveguide polarizer, according to several aspects.
Figure 1B:
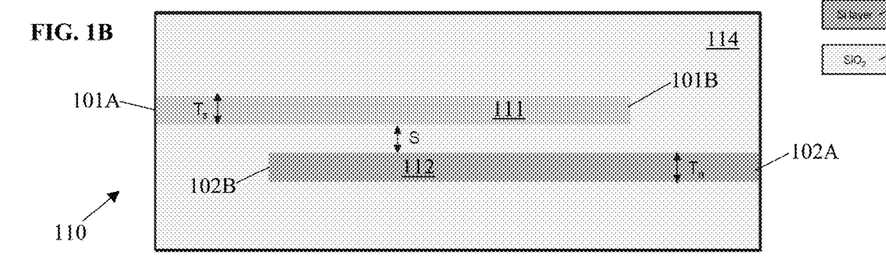

FIGS. 1A-1B are diagrams illustrating a top view and a side view, respectively, of a silicon-nitride 111 to silicon 112 transition 115 used to form an integrated waveguide polarizer, according to several aspects. As described previously above in the Background, an on-chip waveguide polarizer transforms the optical mode of an optical signal, such that to polarize a particular polarization state of the optical signal. As also mentioned previously above, optical light may carry two polarization states, TE and TM, for example. As will be described throughout this disclosure below, the integrated waveguide polarizer (see e.g., FIGS. 3A-3B) may be configured as a TE-pass polarizer, such that optical light propagating through the integrated waveguide polarizer 110 may propagate along the TE mode.

As will be described throughout this disclosure below, the integrated waveguide polarizer ("integrated waveguide polarizer," "on-chip waveguide polarizer," "waveguide polarizer," "polarizer") may be formed by a cascading of transitions 115 between a silicon-nitride (SiN) layer 111 and a silicon (Si) layer 112 (from left to right), as an example, one of such transitions being shown in FIGS. 1A-1B. The silicon-nitride layer 111 may be deposited above the silicon layer 112, as shown, such that at least a portion of the silicon-nitride layer 111 coaxially overlaps with at least a portion of the silicon layer 112, for example. It should be understood that, although the silicon-nitride layer 111 is depicted as being deposited above the silicon layer 112 in FIGS. 1A-1B, the transition 115 may be alternatively configured such that the silicon layer 112 is deposited above the silicon-nitride layer 111, for example. As shown in FIG. 1A, the transition 115 between the silicon-nitride layer 111 and the silicon layer 112 may be realized via an inversely tapered configuration, as an example. As shown, the silicon-nitride layer 111 may comprise a first end 101A having a first width $W_{s,1}$ and a second end 101B having a second width $W_{s,2}$, the first width $W_{s,1}$ being wider/larger than the second width $W_{s,2}$, such that the tapered shape of the silicon-nitride layer 111 is formed, for example. Similarly, as shown in FIG. 1A, the silicon layer 112 may comprise a first end 102A having a first width $W_{n,1}$ and a second end 102B having a second width $W_{n,2}$, the first width $W_{n,1}$ being wider/larger than the second width $W_{n,2}$, such that the tapered shape of the silicon layer 112 is formed. The particular widths of the first and the second ends of each layer 111 and 112, and the transition length 113 may be user-selected, as will be discussed in more detail later. As will be described in detail below, by tapering the waveguide in both layers 111, 112 in opposite directions, as shown, the optical mode (e.g., TE and TM) of an optical signal can be transformed between waveguides of the two layers 111 and 112.

As an example, the transition 115 may be integrated directly onto an optical channel of an integrated photonics chip (not shown), such that an optical signal propagating along the optical channel may become polarized when traversing between the SiN—Si layer transition 115, as will be described in greater detail when referring to FIGS. 3A-3B. As an example, each transition 115 may be integrated onto an integrated photonics chip using the CMOS process flow of commercial silicon photonics foundries, for example. As such, the manufacturing of integrated photonics chips with the disclosed waveguide polarizer may not require any new or custom microfabrication tools or processes. Thus, an advantage is that the disclosed waveguide polarizer may be integrated onto a photonics chip using suitable and readily available CMOS fabrication processes. As shown in FIGS. 1A-1B, the silicon-nitride layer 111 and the silicon layer 112 may be provided with an oxide layer (e.g., silicon dioxide ($SiO_2$)) 114 spaced between the layers 111 and 112, as an example. Furthermore, as shown, the oxide layer 114 may be configured to surround the outer edges of both the silicon-nitride layer 111 and the silicon layer 112, such that the oxide layer is thus at least partially integral to the optical channel (mentioned above). Thus, the surrounding oxide layer 114 may function as an optical insulator (as in cladding), for example. As is known, in the field of fiber optics, cladding materials are usually chosen for their low refractive indices, such that to cause optical light to be confined to the core of the waveguide during propagation. In this case, the oxide layer 114 has a lower refractive index than those of the silicon-nitride layer 111 and the silicon layer 112. For example, silicon has a refractive index of 3.45 and silicon-nitride has a refractive index of 2.0, while oxide has a refractive index of 1.45. Thus, an optical signal propagating through the transition 115 will be confined to the silicon-nitride and silicon layers 111 and 112, respectively.

As shown in FIG. 1A, an overlap 113 of the silicon-nitride layer 111 with the silicon layer 112 may create the transition 115, which may have a length L, as an example. The length L of the transition 115 may be provided at varying lengths, determined by the user (e.g., a manufacturer, engineer, etc.) during the chip design process, for example, such that the polarization parameters (described previously in the Background), such as TE loss and the polarization extinction ratio, may be optimized, as will be discussed in greater detail later. As shown in FIG. 1B, the silicon-nitride layer 111 and the silicon layer 112 may have thicknesses $T_s$ and $T_n$, respectively, as an example. As mentioned above, the silicon-nitride and silicon layers 111 and 112 may be separated by an insulating silicon dioxide layer 114, having a separation spacing S, as shown as an example. The thicknesses $T_s$ and $T_n$, and the spacing S between them, may be determined/selected by the user during the CMOS microfabrication foundry process, for example, and these values may be provided in varying quantities, as selectively needed, in order to optimize the polarization parameters, which will be described in greater detail below.

As described throughout this disclosure above, the silicon-nitride layer 111 and the silicon layer 112 may each possess exemplary geometric dimensions/quantities, such as, for example, widths $W_{s,1}$, $W_{s,2}$, and $W_{n,1}$, $W_{n,2}$, respectively, a thickness $T_s$ and $T_n$, respectively, and spacing S, as well as the transition overlap length L, as shown in FIGS. 1A-1B. As similarly mentioned above, the aforementioned geometric dimensions may be user selectable, but may also be limited/constrained by physical limitations of the CMOS foundry process (e.g., the minimum tip width that is limited by the resolution of the photolithography process), for example. As mentioned previously above, the optical mode of an optical signal propagating along an integrated photonics die may be transformed by the silicon and silicon-nitride layers 112 and 111 having waveguide widths $W_{n,2}$ and $W_{s,2}$, respectively. As stated previously, the silicon-dioxide layer 114 may confine an optical signal to the waveguide silicon-nitride and silicon layers 111 and 112, respectively, such that the optical signal must propagate via the transition 115. As also stated above, each layer 111 and 112 may be tapered, with the narrower end widths $W_{s,2}$ and $W_{n,2}$ being oriented toward and overlapped with one another, as shown in FIG. 1A. The second widths $W_{s,2}$ and $W_{n,2}$ should preferably be configured to be sufficiently small numbers, such that the accumulated loss for the TE polarization state is as small as possible, while the accumulated loss for the TM polarization stage is as large as possible, for example. The minimum widths $W_{s,2}$ and $W_{n,2}$ that can ideally be realized (limited by standard photolithography in most silicon photonics foundries) is about a few hundreds of nanometers, for example, such as 200 nm. The transition length 113 may be selected to be an L value that is relatively small, for example, such that to allow shorter, and thus quicker transitions between overlapped silicon-nitride and silicon layers, as an example. The remaining geometric quantities, such as the widths $W_{s,1}$ and $W_{n,1}$, and thicknesses $T_s$ and $T_n$, and spacing S, may then be selected to be any suitably reasonable quantity (e.g., 500 nm), for example, such that to cause a transformation of the optical mode, with small loss for the TE polarization state and large loss for the TM polarization state, as will be described in detail below.

As mentioned above, the geometric dimensions of the silicon-nitride and silicon layers 111 and 112 may be user-selected to achieve a desired difference in loss performance for the two polarization states (TE and TM). As shown in FIG. 1A, the second widths $W_{s,2}$ and $W_{n,2}$ of the second ends 101B and 102B, respectively, of the silicon-nitride layer 111 and the silicon layer 112, respectively, are configured to be smaller (e.g., 200 nm) than the first widths $W_{s,1}$ and $W_{n,1}$ (e.g., 500 nm) of the first ends 101A and 102A, respectively, such that each layer is tapered, as mentioned previously above. As an optical signal transitions (at 115) from the silicon-nitride layer 111 to the silicon layer 112 (or vice versa), the narrowly finite widths $W_{s,2}$ and $W_{n,2}$ of the second ends 101B and 102B, respectively, cause a certain amount of loss for each of the TM and TE polarization states of the optical signal, as an example. As will be discussed in more detail below, the TM polarization loss may be much greater than the TE polarization loss, allowing the polarizer 110 to effectively function as a TE-pass polarizer.

Figure 2:
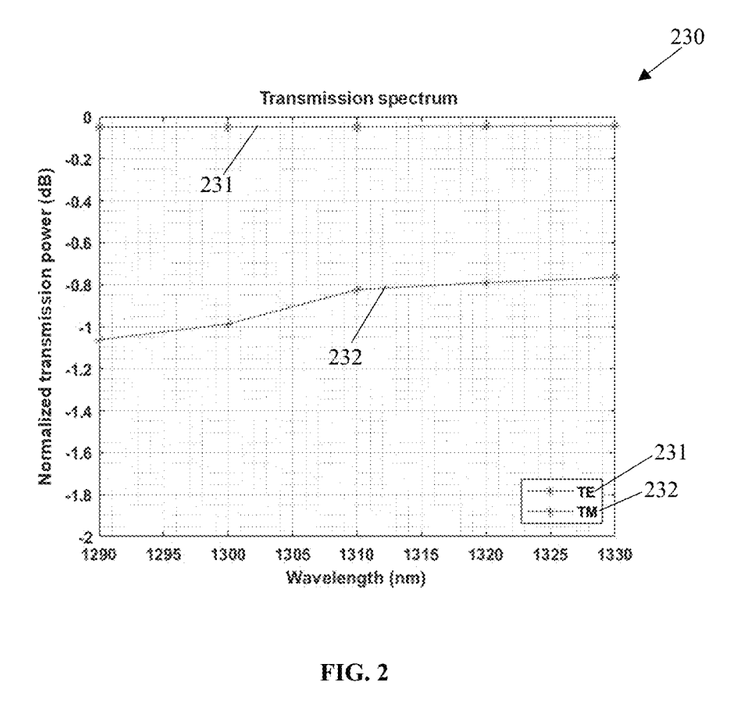
FIG. 2 is an exemplary plot illustrating a simulated optical transmission spectrum of a single transition within an integrated waveguide polarizer, according to an aspect.

FIG. 2 is an exemplary plot illustrating a simulated optical transmission spectrum 230 of a single transition within an integrated waveguide polarizer, according to an aspect. As described throughout this disclosure above, a single transition (e.g., 115 in FIGS. 1A-1B) may comprise two tapered, overlapping silicon-nitride and silicon layers, for example. As mentioned above, as an optical signal transitions from the silicon-nitride layer (111) to the silicon layer (112), for example, the optical signal is subject to TE and TM polarization losses. As will be described in detail below, optical light at TM polarization experiences a higher loss than at TE polarization.

As shown in FIG. 2, the optical transmission spectrum 230 plots the loss of the TE and TM polarization states in decibels (dB) for the optical signal over a broad range of wavelengths in nanometers (nm). As shown, for a single silicon-nitride to silicon transition (or vice versa), such as that shown previously in FIG. 1, for example, the TE polarization loss (shown by curve 231) is much smaller than the TM polarization loss (shown by curve 232) of the optical signal. As shown as an example, the average TE polarization loss 231 for the single transition is practically negligible (only ~0.03 dB), while the average TM polarization loss 232 for the same transition is greater than almost 1 dB (>~0.8 dB). Furthermore, the SiN—Si transition (or vice versa) produces TE and TM polarization loss curves, as shown, that are substantially consistent/stable across a wide range of wavelengths across the O-band (as indicated on the x-axis).

As described previously in the Background above, there are generally at least three key parameters one must optimize for optimal polarizer functionality: the polarization extinction ratio, the device loss, and the optical bandwidth. As described, the polarization extinction ratio is expected to be as large as possible, the device loss is expected to be as small as possible, and the optical bandwidth is expected to be as wide as possible, for optimal polarizer functionality. As evidenced by the transmission spectrum 230 of FIG. 2, the polarization extinction ratio, or the difference between the average TE loss 231 and the average TM loss 232 for a single transition, is relatively high (≥0.77 dB), the average device loss for the TE polarization state for the single transition is relatively low (only ~0.03 dB), and the optical bandwidth is wide (range from 1290 nm to 1330 nm), as one would desire. Thus, as demonstrated by FIG. 2, the disclosed transition (115 in FIGS. 1A-1B) based on reversely tapered silicon and silicon-nitride layers may enable the configuring of a TE-pass integrated waveguide polarizer based on cascading a plurality of such transitions, as will be described in detail below.

Figure 3A:
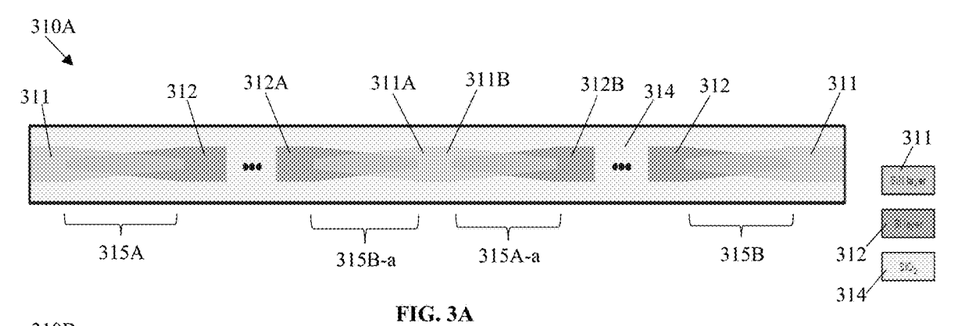
FIGS. 3A-3B are diagrams illustrating top views of integrated waveguide polarizers formed by a plurality of cascaded silicon-nitride to silicon transitions and a plurality of cascaded silicon to silicon-nitride transitions, respectively, according to an aspect.
Figure 3B:
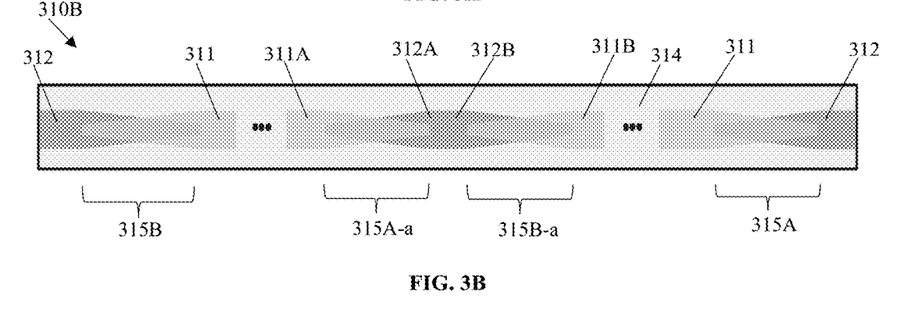

FIGS. 3A-3B are diagrams illustrating top views of integrated waveguide polarizers 310A and 310B formed by a plurality of cascaded silicon-nitride to silicon transitions 315A and a plurality of cascaded silicon to silicon-nitride transitions 315B, respectively, according to an aspect. As described above and shown previously by FIG. 2, a single SiN—Si transition (or vice versa), shown previously in FIG. 1, may produce a polarization extinction ratio of about 1 dB over a wide optical bandwidth. As will be described throughout this disclosure below, a plurality of SiN—Si or Si—SiN transitions may be cascaded to form an integrated waveguide polarizer having optimized polarization parameters.

As shown in FIGS. 3A-3B, a plurality of silicon-nitride layers/elements 311 and silicon layers/elements 312 may be cascaded along an optical channel (not shown) of an integrated photonics chip to form a plurality of silicon-nitride to silicon transitions (e.g., 315A, 315B), and thus, an integrated waveguide polarizer 310A, 310B. As an example, as shown in FIG. 3A, let the optical channel waveguide (not shown) be silicon-nitride-based, such that a silicon-nitride layer 311 is disposed above the provided silicon layer 312 at the beginning and at the end of the integrated waveguide polarizer 310A. As such, the transition at the beginning of the waveguide polarizer 310A may be a SiN—Si transition 315A, and the transition at the end may be a Si—SiN transition 315B. As shown, a plurality of cascaded layer transitions ("cascaded layer transitions," "cascaded transitions") 315B-a-315A-a may be disposed between the beginning and the end of the waveguide polarizer 310A. As an example, a first Si—SiN transition 315B-a may abut/join with a second SiN—Si transition 315A-a, as shown. It should be understood that a greater number of cascaded transitions 315B-a, 315A-a may be provided in the waveguide polarizer 310A, as needed. As shown, the first Si—SiN transition 315B-a may comprise a transition between a silicon layer 312A and a silicon-nitride layer 311A. As similarly described above when referring to FIG. 1, the silicon layer 312A and the silicon-nitride layer 311A may each have a tapered shape oriented to face and overlap with the other, as shown, such that their respective second ends (e.g., 102B and 101B in FIG. 1) may be overlapped facing opposite directions, as shown. As shown in FIG. 3A, the second SiN—Si transition 315A-a may comprise a transition between a silicon-nitride layer 311B and a silicon layer 312B, as similarly shown in FIG. 1. As similarly mentioned above, the silicon-nitride layer 311B and the silicon layer 312B below it may also each comprise an oppositely facing tapered shape ("tapered shape," "taper"), with their respective second ends being overlapped such that to form the SiN—Si transition 315A-a. As shown, the plurality of cascaded transitions 315A-315B may be provided with a surrounding oxide insulator 314, as similarly described above when referring to FIG. 1, for confining an optical signal within the silicon-nitride and silicon layers 311 and 312, respectively, for example, during propagation.

As mentioned above, the first Si—SiN transition 315B-a may abut the second SiN—Si transition 315A-a, as shown in FIG. 3A. As described previously when referring to FIG. 1, each silicon layer and each silicon-nitride layer may comprise a first end having a first width (e.g., $W_{s,1}$ and $W_{n,1}$ in FIG. 1) that is larger than the narrow second width mentioned above, and each overlap of pairs of silicon and silicon-nitride layers may possess a transition length L. As shown in FIG. 3A, the first ends of the silicon-nitride layers 311A and 311B may be coaxially aligned and abutted/joined, for example, such that each transition between layers occurs at the second end of that respective layer. As an example, let an optical signal (not shown) be propagated through the integrated waveguide polarizer 310A comprising the plurality of cascaded transitions, 315A-315B. As the optical signal propagates along the integrated waveguide polarizer 310A, because of the oppositely facing tapers of each layer of each transition, the optical signal is forced to transition between silicon-nitride and silicon layers at the second end (i.e., the narrow end of the taper). As discussed previously above when referring to FIG. 1, the transition from one layer to another causes a loss for both the TE and TM polarization states of the optical signal. The cascading of transitions 315A-315B, as shown in FIG. 3A, may thus cause an increasing summation of polarization losses, such that after each transition, the optical signal incurs increasing levels of loss for each of the TE and TM polarization states, for example.

As another example, as shown in FIG. 3B, let the optical channel waveguide (not shown) again be silicon-based, however, let the silicon layer 312 be disposed at the beginning and at the end of the integrated waveguide polarizer 310B, such that a silicon-nitride layer 311 is disposed above the provided silicon layers 312. As such, the transition at the beginning of the waveguide polarizer 310B may be a Si—SiN transition 315B, and the transition at the end may be a SiN—Si transition 315A. As shown, a plurality of cascaded transitions 315A-a-315B-a may be disposed between the beginning and the end of the waveguide polarizer 310B. As an example, a first SiN—Si transition 315A-a may abut a second Si—SiN transition 315B-a. It should be understood that a greater number of cascaded transitions 315A-a, 315B-a may be provided in the waveguide polarizer 310B, as needed. As shown, the first SiN—Si transition 315A-a may comprise a transition between a silicon-nitride layer 311A and a silicon layer 312A. As similarly described above, the silicon-nitride layer 311A and the silicon layer 312A may each have a tapered shape oriented to face and overlap with the other, as shown, such that their respective second ends (e.g., 102B and 101B in FIG. 1) may be overlapped in oppositely-facing directions, as shown. As shown in FIG. 3B, the second Si—SiN transition 315B-a may comprise a transition between a silicon layer 312B and a silicon-nitride layer 311B, as similarly shown in FIG. 3A. As similarly mentioned above, the silicon layer 312B and the silicon-nitride layer 311B above may also each comprise an oppositely facing tapered shape, with their respective second ends being overlapped, such that to form the Si—SiN transition 315B-a. As shown, the plurality of cascaded transitions 315B-315A may be provided with a surrounding oxide insulator 314, as similarly described above, for confining an optical signal within the silicon-nitride and silicon layers 311 and 312, respectively, for example, during propagation.

As mentioned above, the first SiN—Si transition 315A-a may abut the second Si—SiN transition 315B-a, as shown in FIG. 3B. As described previously above, each silicon-nitride layer and each silicon layer may comprise a first end having a first width (e.g., $W_{s,1}$ and $W_{n,1}$ in FIG. 1) that is larger than the narrow second width mentioned above. As shown in FIG. 3B, the first ends of the silicon layers 312A and 312B may be coaxially aligned and abutted, for example, such that each transition between layers occurs at the second end of that respective layer. Additionally, as mentioned previously above when referring to FIGS. 1A-1B, the transition overlap length (e.g., L) may be selectively chosen (e.g., to be suitably small), such that to enable successive quick transitions. As an example, let an optical signal (not shown) be propagated through the integrated waveguide polarizer 310B comprising the plurality of cascaded transitions, 315B-315A, as shown. As the optical signal propagates along the integrated waveguide polarizer 310B, because of the oppositely facing tapers of each layer of each transition, the optical signal is forced to transition between silicon and silicon-nitride layers at the second end (i.e., the narrow end of the taper). As discussed previously above, the quick transition from one layer to another causes a certain loss for both the TE and TM polarization states of the optical signal. The cascading of quick transitions 315B-315A, as shown in FIG. 3B, may thus cause an increasing summation of polarization losses, such that after each transition, the optical signal incurs increasing levels of loss for each of the TE and TM polarization states, for example, as mentioned similarly above.

Thus, as outlined above, for either cascaded transition case shown in FIGS. 3A-3B, SiN—Si transitions or Si—SiN transitions may be provided along an optical channel to form a passive, integrated waveguide polarizer. As described previously above when referring to FIG. 2, the TE polarization loss for a single SiN—Si or Si—SiN transition is much smaller than the loss incurred for the TM polarization state, due to the optimized designs of the layers' geometric dimensions (e.g., widths $W_{s,1}$, $W_{s,2}$, and $W_{n,1}$, $W_{n,2}$, respectively, spacing S, thicknesses $T_s$ and $T_n$, and transition length L). The same holds true for the cascaded transitions shown in FIGS. 3A-3B, for example, such that after the final transition (315B in FIG. 3A, 315A in FIG. 3B), the total polarization loss for the TE mode will be much less than that of the TM mode. As will be discussed in detail below, the cascading of multiple silicon and silicon nitride layers may cause the total TM polarization loss of the optical signal to be so high that the TM polarization state effectively cancels out, while the loss for the TE polarization state is very small, such that the disclosed waveguide polarizer (310A, 310B) may be substantially categorized as a TE-pass polarizer.

Figure 4:
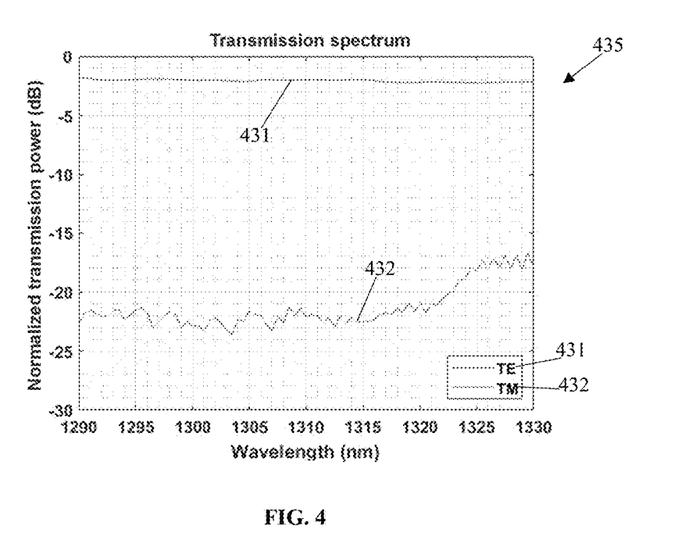
FIG. 4 is an exemplary plot illustrating an experimentally measured optical transmission spectrum of a plurality of cascaded transitions within an integrated waveguide polarizer, according to an aspect.

FIG. 4 is an exemplary plot illustrating an experimentally measured optical transmission spectrum 435 of a plurality of cascaded transitions within an integrated waveguide polarizer, according to an aspect. As described previously above and shown in FIGS. 3A-3B, a plurality of SiN—Si or Si—SiN transitions may be integrated onto an optical channel of an integrated photonics chip to form a waveguide polarizer. As mentioned above, the cascading of the transitions produces different insertion losses for the TE and TM polarization states of an optical signal propagating between the cascaded transitions. As will be described in detail below, the cascading of the SiN—Si/Si—SiN transitions may not only disproportionately increase the total loss for each of the TE and TM polarization states but may thus also optimize the key polarization parameters described throughout this disclosure above.

As shown in FIG. 4, the optical transmission spectrum 435 plots the loss of the TE and TM polarization states in decibels (dB) for the optical signal over a broad range of wavelengths in nanometers (nm). As shown, for tens of cascaded silicon-nitride to silicon transitions (or vice versa) (e.g., 30 transitions) in the exemplary waveguide polarizers 310A and 310B of FIGS. 3A-3B, for example, the TE polarization loss (shown by 431) is significantly lower than the TM polarization loss (shown by 432). As shown as an example, the total TE polarization loss 431 incurred from the plurality of cascaded transitions is only about 2 dB on average, which is very small in comparison to the TM polarization loss 232. As shown, the total TM polarization loss 432 incurred from the same number of transitions is greater than 21 dB on average over much of the spectrum. Furthermore, the SiN—Si transitions (or vice versa) produce TE and TM polarization losses, as shown, that are substantially consistent/stable over a wide range of wavelengths (as indicated on the x-axis). The TM polarization loss 432 is so large and can be made larger by the cascading of additional transitions, for example, that the TM polarization state may effectively be blocked out from the optical signal, leaving only the TE polarization state at the output of the waveguide polarizer.

As similarly described above when referring to FIG. 2, there are generally three key parameters one must optimize for optimal polarizer functionality: the polarization extinction ratio, the device loss, and the optical bandwidth. Again, the polarization extinction ratio is expected to be as large as possible, the device loss is expected to be as small as possible, and the optical bandwidth is expected to be as wide as possible, for optimal polarizer functionality. As evidenced by the experimentally measured transmission spectrum 435 of FIG. 4, the polarization extinction ratio, or the difference between the average TE loss 431 and the TM loss 432, is high (~20 dB, on average), the device loss for the TE polarization state is small (only ~2 dB), and the optical bandwidth is wide (stable in range from 1290 nm to 1320 nm), as one would desire. Depending on the required polarization extinction ratio for a given optical application (e.g., >20 dB), the number of cascaded transitions can be appropriately chosen (i.e., a higher extinction ratio requirement, a greater number of transitions). Thus, as demonstrated by FIG. 4, the disclosed integrated waveguide polarizers of FIGS. 3A-3B utilizing cascaded SiN—Si and Si—SiN transitions may be configured as optimal TE-pass polarizer devices. Thus, an advantage is that the cascaded SiN—Si and Si—SiN transitions of the integrated waveguide polarizer may realize a high extinction ratio. Another advantage is that the cascaded SiN—Si and Si—SiN transitions of the disclosed waveguide polarizer may show low device loss for the TE polarization state. An additional advantage is that the SiN—Si and Si—SiN transitions of the disclosed waveguide polarizer may realize a broad optical bandwidth.

Figure 5:
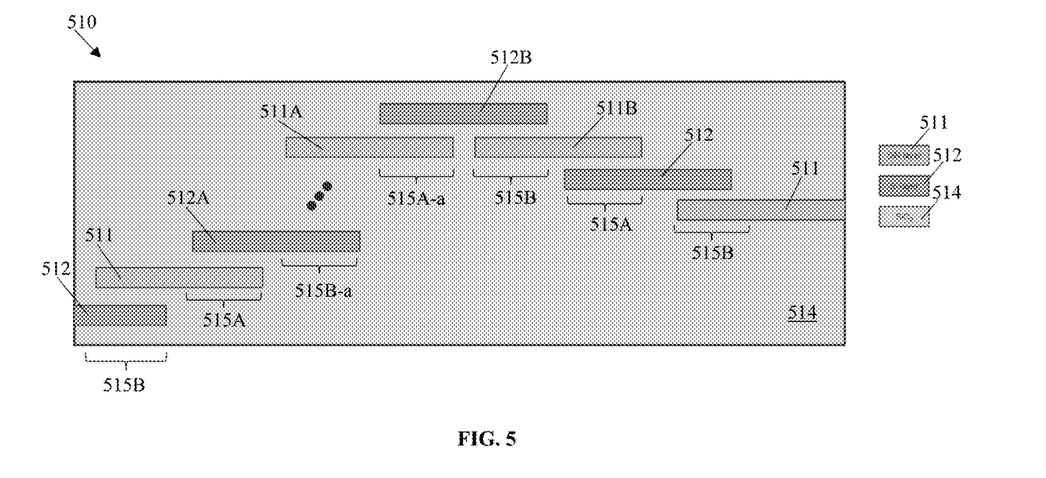
FIG. 5 is a diagram illustrating a side view of another embodiment of an integrated waveguide polarizer formed by a plurality of silicon-nitride layers and a plurality of silicon layers, according to an aspect.

FIG. 5 is a diagram illustrating a side view of another embodiment of an integrated waveguide polarizer 510 formed by a plurality of silicon-nitride layers 512 and a plurality of silicon layers 511, according to an aspect. As described previously throughout this disclosure above, silicon-nitride and silicon layer transitions may be overlapped and cascaded within the waveguide of an optical channel, such that to create an integrated waveguide TE pass polarizer. As shown previously in FIGS. 3A-3B, the cascading of silicon (or silicon-nitride) to silicon-nitride (or silicon) layer transitions (e.g., 315A in FIGS. 3A-3B) between only two waveguide core layers, may form a continuous horizontal chain for inducing additive losses on the TE and TM polarization states of a propagating optical signal. As will be described in detail below, the integrated waveguide polarizer may alternatively be provided by the continuous overlapping (i.e., vertical cascading) of layers in a plurality of waveguide core layers, rather than horizontal cascading of silicon (or silicon-nitride) to silicon-nitride (or silicon) layer transitions between only two waveguide core layers.

As shown as an example in FIG. 5, a plurality of silicon-nitride layers 511 and silicon layers 512 may be overlapped along an optical channel (not shown) of an integrated photonics chip to form a plurality of overlapped silicon-nitride to silicon transitions (e.g., 515A, 515B), and thus, an integrated waveguide polarizer 510. As an example, let the optical channel waveguide (not shown) be silicon-based, and let the silicon layer 512 be disposed at the beginning (i.e., the bottom) end (the input waveguide) of the integrated waveguide polarizer 510, as shown, such that a silicon-nitride layer 511 is disposed above the provided silicon layer 512. As such, the transition at the beginning of the waveguide polarizer 510 may be a Si—SiN transition 515B. As shown, a plurality of overlapped transitions 515B-a-515A-a may be disposed between the bottom and the top of the waveguide polarizer 510. As an example, a first SiN—Si transition 515A may lead to a second Si—SiN transition 515B-a, which leads to an overlapping second SiN—Si transition 515A-a, and so on. It should be understood that a greater (or lesser) number of overlapped transitions 515B-a to 515A-a may be provided in the waveguide polarizer 510, as needed.

As shown, the first SiN—Si transition 515A may comprise a transition between a silicon-nitride layer 511 and a silicon layer 512A. As similarly described above, the silicon-nitride layer 311A and the silicon layer 312A may each have a tapered shape oriented to face and overlap with the other, as shown previously in FIG. 1A, such that their respective second ends (e.g., 102B and 101B in FIG. 1) may be overlapped in oppositely-facing directions, as shown. As shown in FIG. 5, the second Si—SiN transition 515B-a may comprise a transition between a silicon layer 512A and a silicon-nitride layer 511A (with any number of intervening transitions in between, as indicated), which leads to the overlapping second SiN—Si transition 515A-a at the top of the integrated waveguide polarizer 510. As similarly mentioned above, the silicon-nitride layer 511A and the silicon layer 512B above may also each comprise an oppositely facing tapered shape, with their respective second ends being overlapped, such that to form the SiN—Si transition 515A-a. As indicated, from the top of the waveguide polarizer 510 (at Si layer 512B, for example) the overlapping of transitions (515B) may continue downwardly on to the second end (i.e., the exit waveguide) layer of the waveguide polarizer 510 (at SiN layer 511, for example). As shown, the plurality of overlapped transitions 515B-515A may be provided with a surrounding oxide insulator 514, as similarly described above, for confining an optical signal within the silicon-nitride and silicon layers 511 and 512, respectively, for example, during propagation.

As mentioned above, the first Si—SiN transition 515B may lead to the second SiN—Si transition 515A-a, as shown in FIG. 5. As described previously when referring to FIG. 1, each silicon layer and each silicon-nitride layer may comprise a first end having a first width (e.g., $W_{s,1}$ and $W_{n,1}$ in FIG. 1) that is larger than the narrow second width mentioned above, and each successive overlap of pairs of silicon and silicon-nitride layers may possess a transition length L. As shown in FIG. 5, the first ends of the top silicon-nitride layers 511A and 511B may be coaxially aligned and facing, for example, such that each transition (e.g., 515A, 515B-a) that occurs below them occurs at the second end between each respective layer. As an example, let an optical signal (not shown) be propagated through the integrated waveguide polarizer 510 comprising the plurality of overlapped transitions, 515A-515B. As the optical signal propagates along the integrated waveguide polarizer 310A, because of the oppositely facing tapers of each layer of each transition, the optical signal is forced to transition between silicon-nitride and silicon layers at the layer's second end (i.e., the narrow end of the taper). As discussed previously above when referring to FIG. 1, the transition from one layer to another causes a loss for both the TE and TM polarization states of the optical signal. The overlapping of transitions 515A-515B, as shown in FIG. 5, may thus cause an increasing summation of polarization losses, as the optical signal travels through the plurality of overlapped transitions, such that after each transition, the optical signal incurs increasing levels of loss for each of the TE and TM polarization states, for example.

Thus, as outlined above, for the overlapped transitions shown in FIG. 5, SiN—Si transitions or Si—SiN transitions may be provided along an optical channel to form a passive, integrated waveguide polarizer. As described previously above when referring to FIG. 2, the TE polarization loss for a single SiN—Si or Si—SiN transition is much smaller than the loss incurred for the TM polarization state, due to the optimized designs of the layers' geometric dimensions (e.g., widths $W_{s,1}$, $W_{s,2}$, and $W_{n,1}$, $W_{n,2}$, respectively, spacing S, thicknesses $T_s$ and $T_n$, and transition length L). The same holds true for the overlapped transitions shown in FIG. 5, for example, such that after the final transition (515B in FIG. 5), the total polarization loss for the TE mode will be much less than that of the TM mode. As discussed in detail previously when referring to FIG. 4, the cascading of multiple silicon and silicon nitride layers may cause the total TM polarization loss of the optical signal to be so high that the TM polarization state is effectively filtered out, while the loss for the TE polarization state is very small, such that the disclosed waveguide polarizer (e.g., 310A, 310B) may be substantially categorized as a TE-pass polarizer. Thus, applying the same principle as above, the overlapping of multiple silicon and silicon-nitride layers may cause the total TM polarization loss of the optical signal to be so high that the TM polarization state is effectively filtered out, while the loss for the TE polarization state is very small, such that the disclosed waveguide polarizer 510 may function effectively as a TE-pass polarizer.

It should be understood that the overlapping of the layers shown in FIG. 5 may be reversed, such that a silicon-nitride layer (e.g., 511) is disposed at the very bottom of the waveguide and a silicon-nitride layer (e.g., 511B) is disposed at the very top, for example. It should be understood that while the overlapping of layer transitions, as shown in FIG. 5, creates a pyramid/triangular shape, the overlapping of layer transitions may be inverted, such that the overlapping of layer transitions alternatively creates a V/inverted pyramid shape, for example. Moreover, for example, the overlapping of silicon and silicon-nitride layers may be done in either direction vertically up or down as many times as desired (to reach a desired loss level, for example). It should also be understood that the end layer (i.e., the exit waveguide) may not have to be the lowest/bottom layer (e.g., 511), as indicated by FIG. 5. In other words, the input waveguide and the exit waveguide can be any arbitrary layer within the multi-layer vertically cascaded structure that makes up the integrated waveguide polarizer.

As mentioned previously throughout this disclosure above, the waveguide polarizer disclosed herein may be optically integrated directly onto the optical channel(s) of an integrated photonics chip. Because the disclosed waveguide polarizer comprises one or more transitions based on silicon and silicon-nitride layers, the polarizer may be a passive optical component, such that the polarizer requires no external electrical power. As such, in comparison to conventional polarizers that utilize active optical components requiring electrical power, such as those based on carrier injections, for example, the disclosed waveguide polarizer may be superior and thus more beneficial, as the disclosed polarizer is capable of achieving optimal functionality without any external electrical power. Thus, in comparison to conventional methods using active optical polarizers, an advantage of the disclosed passive waveguide polarizer is a reduction in overall power consumption, and therefore operational costs, during product operation.

As discussed throughout this disclosure above, the integrated waveguide polarizer may be formed via Si—SiN and/or SiN—Si transitions, with the number of transitions being at least one in either case. As mentioned above, the silicon and/or silicon nitride layers may be integrated directly onto the optical waveguide/channel of the integrated photonics chip. As an example, optical channels may be silicon-based or silicon-nitride-based, as mentioned previously above when referring to FIGS. 3A-3B. For the case where the optical waveguide is silicon-based, only a single silicon-nitride layer is needed (layered atop the existing silicon waveguide). Compared to previous methods that require two photolithography and two etch steps to create a shallow ridge waveguide, as mentioned previously in the Background above, the disclosed approach using single layers is much simpler. Additionally, for the case where the optical waveguide is silicon-nitride based, no etched ridge waveguide can be created on the optical waveguide because most commercial foundries provide only a single layer of silicon nitride (e.g., in the CMOS process flow). Thus, in comparison to the prior art polarizer based on etched ridge waveguides, the disclosed waveguide polarizer allows for a much more simplified and more realistic microfabrication approach, and also allows for integration on waveguides based on either silicon or silicon-nitride. Thus, an advantage is that the disclosed waveguide polarizer may be universally applied to various optical waveguides, not just optical waveguides based on silicon.

It should be understood that light may travel through the SiN—Si and/or Si—SiN transition(s) of the disclosed waveguide polarizer bidirectionally and/or reciprocally. It should also be understood that for cascaded layer transitions, each transition layer may comprise different geometric dimensions (e.g., layer widths and thickness) or the same geometric dimensions, as needed or desired to achieve optimal polarization functionality. It should also be understood that the number of cascaded transitions may be as many as needed (e.g., tens of cascaded transitions) to achieve a certain degree of polarization for any given optical application. It should be noted that the shape of the taper of the silicon layer and/or silicon-nitride layer may be linear (as shown in the drawings), parabolic, or any other suitable curve. It should be understood that the disclosed transition structure may be generalized to two waveguide layers made by different suitable materials, rather than the silicon and silicon-nitride layers disclosed herein above. The chosen materials should thus be suitably different such that to yield a proper reflective index contrast. It should be noted that the disclosed waveguide polarizer can be utilized for optical signals propagating at various wavelength bands other than O-band, such as, for example, E, S, C or L-band. It should also be understood that the plots presented in the drawings are exemplary are not intended to be limiting with respect to the capabilities of the disclosed waveguide polarizer. It should also be understood that the relative sizes and proportions of the silicon and silicon-nitride layers depicted in the drawings are not drawn to scale and should not be limited by such.

It may be advantageous to set forth definitions of certain words and phrases used in this patent document. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this disclosure above, the terms "on-chip" and "integrated" are synonymous and are therefore interchangeable. Both of the aforementioned terms refer to optical elements optically connected or embedded on a photonics chip. Additionally, as used in this application, the phrases "optical signal," "optical light" and related terms refer to any form of light, which should be understood as being a form of electromagnetic radiation originating from lasers, laser diodes, light emitting diodes (LEDs), etc.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An integrated waveguide polarizer comprising:
a plurality of silicon layers and a plurality of silicon-nitride layers;
each of the plurality of silicon layers and each of the plurality of silicon-nitride layers having a first end and an opposite second end, the first end having a selectively wide width and the second end having a selectively narrow width, such that each silicon layer and each silicon-nitride layer have tapered shapes;
wherein the plurality of silicon layers and the plurality of silicon-nitride layers are overlapped, such that at least a portion of each silicon-nitride layer overlaps at least a portion of each silicon layer; and
a plurality of oxide layers disposed between the pluralities of silicon-nitride layers and silicon layers, each oxide layer of the plurality of oxide layers creating a separation spacing between each silicon-nitride layer and each silicon layer;
wherein, when an optical signal having a transverse-electric (TE) polarization state and a transverse magnetic (TM) polarization state is launched through the integrated waveguide polarizer, the optical signal is caused to transition between each silicon-nitride layer and each silicon layer via the overlapped portions of each silicon-nitride and silicon layers, the transitioning between each silicon-nitride and silicon layers inducing losses on the TE and TM polarization states of the optical signal, the induced loss on the TE polarization state being lower than the induced loss on the TM polarization state.

2. The integrated waveguide polarizer of claim 1, wherein the plurality of silicon layers is configured to be incorporated into a plurality of optical waveguides of an integrated photonics chip, such that the optical signal is launched through a first silicon layer of the plurality of silicon layers via a first optical waveguide of the plurality of optical waveguides.

3. The integrated waveguide polarizer of claim 2, wherein the plurality of oxide layers is further configured to surround the plurality of silicon-nitride layers and the plurality of silicon layers, the plurality of oxide layers thus being at least partially integral to the plurality of optical waveguides, such that to provide cladding for each of the silicon-nitride and silicon layers.

4. The integrated waveguide polarizer of claim 1, wherein each silicon-nitride layer and each silicon layer are coaxially overlapped.

5. The integrated waveguide polarizer of claim 1, wherein the overlap between the at least a portion of each silicon-nitride layer and the at least a portion of each silicon layer has a user-selectable length.

6. The integrated waveguide polarizer of claim 1, wherein the selectively narrow widths of the second ends of the pluralities of silicon-nitride layers and silicon layers are equal in value.

7. The integrated waveguide polarizer of claim 1, wherein the selectively wide widths of the first ends of the pluralities of silicon-nitride layers and silicon layers are equal in value.

8. The integrated waveguide polarizer of claim 1, wherein each silicon-nitride layer and each silicon layer have thicknesses, the thicknesses of each silicon-nitride layer and each silicon layer being equal in value.

9. An integrated waveguide polarizer comprising:
a plurality of cascaded layer transitions, each cascaded layer transition of the plurality of cascaded layer transitions having:
a silicon layer and a silicon-nitride layer each having a first end and an opposite second end, the first end having a selectively wide width and the second end having a selectively narrow width, such that the silicon layer and the silicon- nitride layer each has a tapered shape;
the silicon-nitride layer being disposed above the silicon layer, such that at least a portion of the silicon-nitride layer overlaps at least a portion of the silicon layer, such that the second ends of the silicon-nitride layer and the silicon layer are overlapped and oriented to face in opposite directions; and
wherein a first and a second cascaded layer transitions of the plurality of cascaded layer transitions are coaxially aligned, such that the first ends of a first and a second silicon-nitride layers of the first and the second cascaded layer transitions, respectively, are coaxially aligned and joined, such that the second ends of a first and a second silicon layers of the first and the second cascaded layer transitions, respectively, are oriented to face each other.

10. The integrated waveguide polarizer of claim 9, wherein, when an optical signal having a transverse-electric (TE) polarization state and a transverse magnetic (TM) polarization state is launched through the first cascaded layer transition, the optical signal is caused to transition between the first silicon layer and the first silicon-nitride layer via the overlapped portions of the first silicon and first silicon-nitride layers, the optical signal then being propagated through the second cascaded layer transition, the optical signal being transitioned between the second silicon-nitride layer and the second silicon layer via the overlapped portions of the second silicon-nitride and second silicon layers, the propagation through the first and the second cascaded layer transitions inducing losses on the TE and TM polarization states of the optical signal, the induced loss on the TE polarization state being lower than the induced loss on the TM polarization state.

11. The integrated waveguide polarizer of claim 10, wherein the plurality of cascaded layer transitions is configured to be incorporated into an optical waveguide of an integrated photonics chip, such that the optical signal is launched through the first cascaded layer transition via the optical waveguide.

12. The integrated waveguide polarizer of claim 9, wherein each cascaded layer transition further comprises an oxide layer disposed between the silicon-nitride layer and the silicon layer, the oxide layer creating a separation spacing between the silicon-nitride layer and the silicon layer.

13. The integrated waveguide polarizer of claim 9, wherein a third cascaded layer transition is coaxially aligned with the first and the second cascaded layer transitions, such that the first ends of the second and a third silicon layers of the second and the third cascaded layer transitions, respectively, are coaxially aligned and joined, such that the second ends of the second and a third silicon-nitride layers of the second and the third cascaded layer transitions, respectively, are oriented to face each other.

14. The integrated waveguide polarizer of claim 9, wherein each silicon layer and each silicon-nitride layer of each cascaded layer transition of the plurality of cascaded layer transitions has a thickness, the thickness of each silicon-nitride layer and each silicon layer being equal in value.

15. The integrated waveguide polarizer of claim 9, wherein the overlap between the at least a portion of the silicon-nitride layer and the at least a portion of the silicon layer of each cascaded layer transition has a user-selectable length.

16. A method of integrating a waveguide polarizer onto an optical waveguide of an integrated photonics chip, the method comprising the steps of:
depositing a plurality of first layers each having a first end and an opposite second end onto the optical waveguide, each first end having a selectively wide width and each second end having a selectively narrow width;
providing an oxide layer having a thickness atop each first layer of the plurality of first layers, the oxide layer providing a separation spacing above each first layer; and
depositing a plurality of second layers each having a first end and an opposite second end atop each of the oxide layers, such that at least a portion of each second layer overlaps at least a portion of each first layer, each first end having a selectively wide width and each second end having a selectively narrow width;
wherein each first layer and each second layer are coaxially aligned;
the waveguide polarizer being thus adapted such that when an optical signal having a transverse-electric (TE) polarization state and a transverse magnetic (TM) polarization state is launched into the optical waveguide, the optical signal is propagated through the pluralities of first and second layers, the optical signal being caused to transition between each first layer and each second layer via the overlapped portions of each first and second layers, the transitioning between each first and each second layers inducing losses on the TE and TM polarization states of the optical signal.

17. The method of claim 16, wherein the plurality of first layers is a plurality of silicon layers, and the plurality of second layers is a plurality of silicon-nitride layers.

18. The method of claim 16, wherein the plurality of first layers is a plurality of silicon-nitride layers, and the plurality of second layers is a plurality of silicon layers.

19. The method of claim 16, wherein the overlap between the at least a portion of each second layer and the at least a portion of each first layer has a user-selectable length.

20. The method of claim 16, wherein the induced loss on the TE polarization state is lower than the induced loss on the TM polarization state.

* * * * *